United States Patent
Massaccesi et al.

(10) Patent No.: US 7,168,360 B2
(45) Date of Patent: Jan. 30, 2007

(54) STEERING SYSTEM ACTUATOR FOR VEHICLE WITH AT LEAST THREE STEERED WHEELS

(75) Inventors: Gianni Massaccesi, Vigodarzere (IT); Renzo Cuppi, Monteveglio (IT); Carlo Viappiani, Bagnolo In Piano (IT)

(73) Assignee: Comer Industries S.P.A., Reggiolo (IT)

( * ) Notice: Subject to any disclaimer, the term of this patent is extended or adjusted under 35 U.S.C. 154(b) by 0 days.

(21) Appl. No.: 11/086,425

(22) Filed: Mar. 23, 2005

(65) Prior Publication Data
US 2005/0166585 A1 Aug. 4, 2005

(30) Foreign Application Priority Data
Jan. 29, 2004 (IT) ................... MO2004A0019

(51) Int. Cl.
*F01B 31/04* (2006.01)
*B62D 5/06* (2006.01)

(52) U.S. Cl. .................... 92/181 P; 92/181 R

(58) Field of Classification Search .............. 92/181 R, 92/181 P, 182–185
See application file for complete search history.

(56) References Cited

U.S. PATENT DOCUMENTS 3,181,429 A * 5/1965 Washbond .................... 91/401
3,315,570 A * 4/1967 Brewer et al. ................ 91/401
4,006,664 A * 2/1977 Brown ......................... 91/171

FOREIGN PATENT DOCUMENTS

EP 0 321 756 A 6/1989

* cited by examiner

*Primary Examiner*—Thomas E. Lazo
(74) *Attorney, Agent, or Firm*—Modiano & Associati; Albert Josif; Daniel O'Byrne

(57) ABSTRACT

A linear actuator for vehicle power steering systems with at least three steered wheels of a double-acting type that comprises a cylindrical body, closed at opposite ends; a piston, accommodated inside the cylindrical body axially slideable between the ends; and a stem, rigidly associated with the piston, coaxial to the cylindrical body, and protruding from at least one of the ends, the piston dividing the cylindrical body into two chambers, each provided with an inflow/outflow opening formed at the two opposite ends; and at least one pair of one-way valves, provided in the piston with a respective inlet connected to a respective chamber and outlets mutually connected, each valve having a stem slideably accommodated in the respective inlet with one end associated with a respective flow control element and the opposite end that protrudes externally from the piston, so as to open a respective valve.

20 Claims, 3 Drawing Sheets

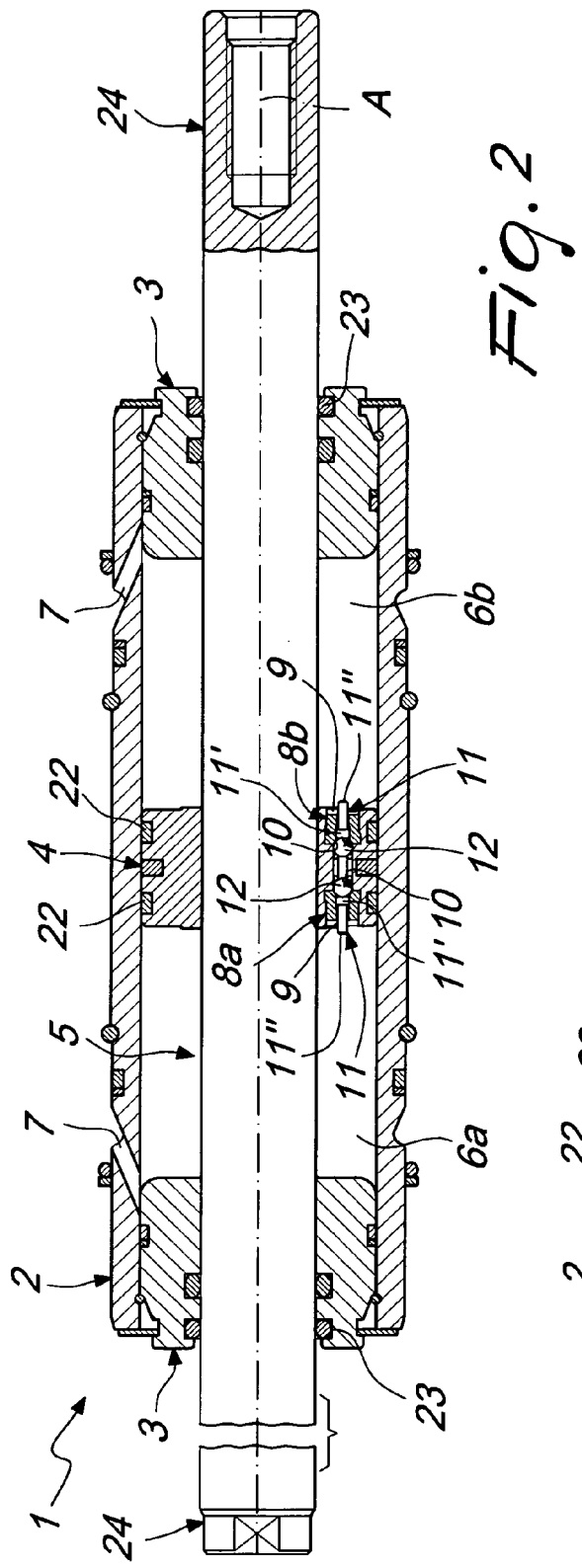
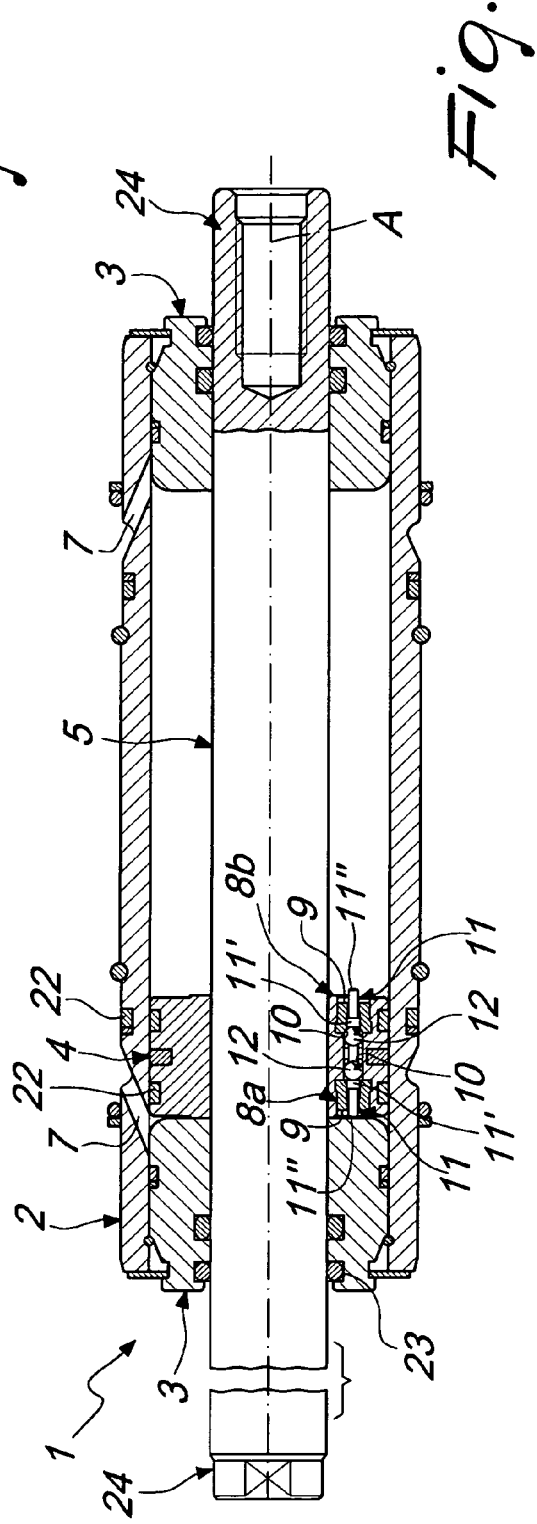
Fig. 2
Fig. 3

STEERING SYSTEM ACTUATOR FOR VEHICLE WITH AT LEAST THREE STEERED WHEELS

The present invention relates to a fluid-operated linear actuator for hydraulic or mechanical power steering of vehicles with at least three steered wheels.

BACKGROUND OF THE INVENTION

Purely hydraulically-actuated steering systems, particularly for vehicles with four steered wheels, are known which substantially comprise two steered front wheels and two steered rear wheels, which are associated with a respective actuation mechanism operated by a fluid medium (oil), a tank for the fluid, and a pump that feeds the fluid drawn from the tank to a hydraulic power steering unit, which controls its flow along a line for transmission to the two actuation mechanisms, a line for returning the fluid to the tank by means of said hydraulic power steering unit being provided.

The hydraulic power steering unit is controlled externally by means of a steering column provided with a control wheel.

Each one of the two actuation mechanisms is constituted by a double-acting hydraulic cylinder, the stem of which reaches outside both opposite ends of the cylinder body in order to actuate a respective wheel, the chambers of the two cylinders being provided with a respective opening that is connected selectively to the chambers of the other cylinder, to the delivery from the hydraulic power steering unit, and to the return to said unit.

Devices for reversing the flow of the fluid and/or valves and/or distribution units that are suitable to select the steering modes, with two or four wheels, can optionally be provided along the transmission line.

In the mode with four steered wheels, the fluid, sent under pressure by the pump to the hydraulic power steering unit, is sent to feed a chamber of one of the two hydraulic cylinders, the fluid in output from the opposite chamber of that cylinder is sent, by means of the transmission line, to feed a chamber of the other hydraulic cylinder, while the fluid in output from the opposite chamber of this last cylinder is sent to the return line, which leads into the tank by means of the hydraulic power steering unit.

Depending on the steering direction, one of the two hydraulic cylinders acts as an actuator for the other cylinder.

These known types of purely hydraulically-actuated steering systems are not free from drawbacks, including the fact that they are affected by bleeding of fluid, which causes misalignments between the front wheels and the rear wheels and therefore cause incorrect steering.

Bleeding occurs in particular within the two hydraulic cylinders and are generally different between the two cylinders, and is due for example to wear of the corresponding sliding components, to dimensional tolerances, et cetera.

In order to obviate this drawback, it is known for example to lock the rear wheels in a "straight" configuration, i.e., parallel to the longitudinal axis of the vehicle, and to "manually" align the front wheels with them by acting on the steering system and checking the position of the front wheels with respect to the rear wheels by means of a simple visual check on the part of operators.

This "manual" method is disadvantageously labor-intensive, time-consuming and inaccurate, since it is entrusted to the skill of the operators; moreover, it is not feasible if the wheels of the vehicles are even only partially covered by a protective housing, such as for example the wheels of certain vehicles for agricultural use or for earth-moving.

Electronic control systems are also known which are substantially constituted by means (sensors) for detecting the steering angle of the front wheels and by means (sensors) for detecting the steering angle of the rear wheels, which are functionally associated with a processing unit, which computes any discrepancy between the two detected values, emitting a corresponding output signal.

The output signal can control, for example, a warning device that reports the detected discrepancy to the operator and therefore reports the need to perform a "manual" realignment of the wheels.

As an alternative, the output signal can control a correction device, which is inserted along the distribution line and by means of which the flow-rate of fluid to be sent to the two hydraulic cylinders in order to realign the wheels can be modified periodically or depending on a preset threshold value of the computed discrepancy.

These electronic control systems are not free from drawbacks, including the fact that they are very complex and expensive, the fact that they do not allow "constant" or "continuous" wheel realignment but only a periodic or occasional realignment, since it is entrusted either to the voluntary intervention of the operator or to the activation of the control device, and the fact that if they merely report to the operator the need to perform realignment, said realignment depends on the skill and sensitivity of said operator.

Finally, automatic realignment devices are known which consist in providing, on the internal wall of the body of the hydraulic cylinders and proximate to their opposite ends, a groove that cooperates with the sealing gasket of the respective piston.

When the piston has reached the end of its stroke, which is generally set by an external locking of the steering lever that connects one end of the stem of the hydraulic cylinder to the respective wheel, the sealing gasket of the piston is arranged at the groove.

Accordingly, a certain amount of oil bleeds from the active chamber of the hydraulic cylinder toward the groove thus exposed, in order to be fed, via a duct for connection to the distribution line, into the active chamber of the other hydraulic cylinder and thus take up any misalignments.

However, even these known automatic realignment devices are not free from drawbacks, including the fact that their operation is inaccurate and inconstant, as it in fact depends on many variables, including for example the dimensional tolerances of the hydraulic cylinders, the elasticity of the gasket used, and the physical characteristics of the fluid used (viscosity, temperature, et cetera), which can vary in different operating conditions.

Another drawback of known automatic devices is that even if the grooves are finished and blended accurately to the internal wall of the cylinder body, they cause abnormal and frequent wear and damage of the piston gasket, which accordingly has a shorter average life and therefore must be replaced frequently.

SUMMARY OF THE INVENTION

The aim of the present invention is to eliminate the above-mentioned drawbacks, by providing a fluid-operated linear actuator for hydraulic or mechanical power steering systems of vehicles with at least three steered wheels that allows to realign automatically, precisely and constantly the rear and front wheels of a vehicle with four steered wheels with a purely hydraulically-actuated steering system, regardless of the skill and sensitivity of the operators and of the particular operating conditions (dimensional tolerances of the cylinder, physical characteristics of the fluid, et cetera).

Another object of the present invention is to provide a fluid-operated linear actuator that does not subject the gasket of the piston to wear, stresses and damage in excess of those that occur during normal operation.

Within this aim, an object of the present invention is to provide an actuator that is simple, relatively easy to provide in practice, safe in use, effective in operation, and has a relatively low cost.

This aim and these and other objects that will become better apparent hereinafter are achieved by the present fluid-operated linear actuator for hydraulic or mechanical power steering systems of vehicles with at least three steered wheels, of the double-acting type and comprising: a cylindrical body, which is closed at its opposite ends; a piston, which is accommodated inside said cylindrical body and can slide axially between said opposite ends; and a stem, which is rigidly associated with said piston, is substantially coaxial to said cylindrical body, and protrudes from at least one of said opposite ends, said piston dividing said cylindrical body into two chambers, each of which is provided with an opening that is formed proximate to said two opposite ends for the inflow and/or outflow of a working fluid; characterized in that said piston comprises at least one pair of one-way valves, in which the respective inlet is connected to a respective said chamber and the respective outlets are mutually connected, said valves being each provided with a stem that is accommodated so that it can slide axially in the respective inlet and has one end that is associated with the respective flow control element and the opposite end that protrudes externally from said piston, the stem being suitable to open the respective valve, the piston being located proximate to the closed end of the corresponding chamber and the other valve being at least partially opened by the flow of the pressurized working fluid in the other chamber, for the transfer of an amount of fluid from the chamber that is at a higher pressure to the chamber that is at a lower pressure.

BRIEF DESCRIPTION OF THE DRAWINGS

Further characteristics and advantages of the present invention will become better apparent from the following detailed description of a preferred but not exclusive embodiment of a fluid-operated linear actuator for hydraulic or mechanical power steering systems of vehicles with at least three steered wheels, illustrated by way of non-limiting example in the accompanying drawings, wherein:

FIG. 2 is a schematic sectional view of a linear actuator according to the invention, with the piston in an intermediate position between the two chambers;

FIG. 3 is a schematic sectional view of a linear actuator according to the invention, with the piston in the stroke limit position;

DESCRIPTION OF THE PREFERRED EMBODIMENTS

Figure 1:
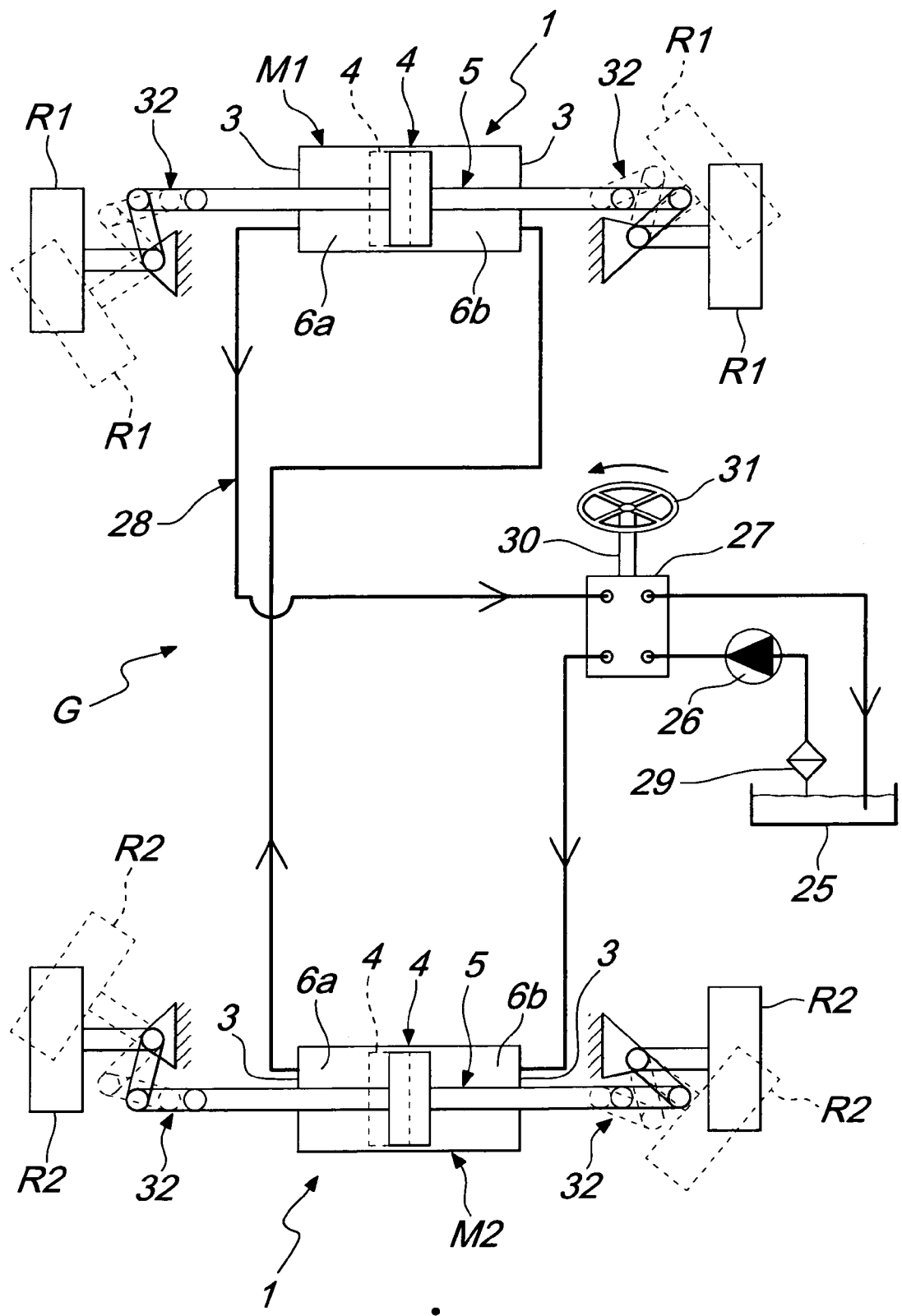
FIG. 1 is a diagram of a hydraulic steering system of a vehicle with four steered wheels, to which two fluid-operated linear actuators according to the invention are applied.

With reference to the figures, the reference numeral 1 generally designates a fluid-operated linear actuator for hydraulic or mechanical power steering systems of vehicles with at least three steered wheels.

The actuator 1 is of the double-acting type and comprises: a cylindrical body 2, which is closed at its opposite ends by a respective end plate 3; a piston 4, which is accommodated inside the cylindrical body 2 and can slide axially between the two end plates 3; and a stem 5, which is rigidly associated with the piston 4, is substantially coaxial to the cylindrical body 2 and protrudes from one or both of the end plates 3.

In the illustrated embodiment, the stem 5 protrudes from both end plates 3 of the cylindrical body 2; as an alternative, it might also protrude from just one of the two end plates 3.

The piston 4 separates the cylindrical body 2 into two chambers 6a and 6b, each of which is provided with an opening 7 that is formed proximate to the respective end plate 3 for the inflow and/or outflow of a working fluid.

The piston 4 comprises at least one pair of one-way valves 8a and 8b, which are arranged inline, are substantially parallel to the axis A of the cylindrical body 2, and have their respective inlet 9 connected to the respective chamber 6a and 6b and their respective outlets 10 connected to each other.

Each one of the two valves 8a and 8b is provided with a stem 11, which is accommodated so that it can slide axially within the respective inlet 9 and has an end 11' that is associated with the respective flow control element 12 and an opposite end 11" that protrudes externally from the piston 4.

The stem 11 is suitable to open the respective valve 8a and 8b when the piston 4 is located proximate to the end plate 3 (closed end) of the corresponding chamber 6a and 6b, the other valve 8a and 8b being at least partially opened by the flow of the pressurized working fluid in the other chamber 6a and 6b in order to transfer an amount of fluid from the higher-pressure chamber to the lower-pressure chamber.

In the embodiment shown in the cited figures, the two valves 8a and 8b are formed by a hole 13, which is formed through the piston 4 with a variable cross-section, its central portion, which has a smaller cross-section, forming the two outlets 10, and by plugs 14, which are snugly accommodated in the open ends of the hole 13 and in which there is a respective guide 15, in which the respective stem 11 is inserted so that it can slide with clearance, and a contact seat 16 for the flow control element 12.

The guides 15 form the inlets 9; inside said inlets there are means for stopping the sliding of the respective stem 11, which are constituted for example by an annular protrusion 17, which is suitable to act as a stop abutment of a collar 18 formed proximate to the end 11' of the stem 11.

Elastic contrast means, such as for example a spring 19, are interposed between the two flow control elements 12, and are suitable to keep them in contact against the respective contact seat 16.

However, alternative embodiments of the valves 8a and 8b are also possible; they might be for example of the mushroom type, or the flow control element 12 and the respective contact seat 16 might have for example a different shape.

Further, the actuator 1 comprises means 20 for spacing the piston 4 from the end plates 3 (closed ends) of the cylindrical body 2, which are suitable to ensure a nonzero volume of the corresponding chamber 6a and 6b when the piston 4 is located proximate to the end plates 3.

The spacer means 20 may comprise, for example, a protrusion 21 that protrudes on both opposite faces of the piston 4; however, alternative embodiments of the spacer means 20 are not excluded: for example, the protrusion 21 might be formed on the surfaces of the end plates 3 that face the inside of the chambers 6a and 6b.

The protruding ends 11" of the stems 11 are longer than the thickness of the protrusions 21 and/or the stroke of the stems 11 is longer than the thickness of the protrusions 21.

The piston 4 is provided with gaskets 22 for providing a seal with the internal walls of the cylindrical body 2; the end plates 3 are provided with respective seals 23 with respect to the stem 5, at the opposite ends of which there are couplings 24 for connection to the user devices that they actuate.

The actuator 1 may be used in particular for hydraulic or mechanical power steering systems for vehicles with at least three steered wheels; FIG. 1 schematically illustrates a purely hydraulically-actuated steering system G of a vehicle with four steered wheels R in two configurations: with "straight" wheels (solid lines) and steering to the left (in dashed lines).

The system G substantially comprises two front steered wheels R1 and two rear steered wheels R2, which are associated with a respective fluid-operated actuation mechanism M1 and M2, a tank 25 for the fluid, and a pump 26 for feeding the fluid from the tank 25 to a hydraulic power steering device that is constituted by a power steering unit 27, which is associated with a line 28 for transmitting the fluid to the two actuation mechanisms M1 and M2 and for the return of said fluid to the tank 25.

A filter 29 is interposed between the pump 26 and the tank 25, while the power steering unit 27 is actuated by a steering column 30 by means of a steering wheel 31.

Each one of the two actuation mechanisms M1 and M2 is constituted by an actuator 1 according to the present invention, in which the stem 5 has ends that protrude from the end plates 3 and are articulated to respective levers 32 for steering a respective wheel R1 or R2.

The steering system might have a configuration that is different from the one shown, which should not be considered as limiting the application of the actuator according to invention.

An essential condition is that the steering system be purely hydraulically-actuated on both front and rear axles, or that it be of the mechanical power-assisted type on one axle and of the hydraulic type on the other axle.

For example, the steering system might be of the mechanical power-assisted type at the front axle and of the hydraulic type at the rear axle, the actuator of the power-assist system being able to act as a pump for the rear control actuator; the actuator 1 can also be applied to this steering system.

Moreover, the system G might comprise additional devices, which are not described or shown because they are of a known type, such as for example flow inverters, distribution units that are suitable to select the steering modes (with two or four wheels), or others.

Thus, the two actuation mechanisms M1 and/or M2 also might have a different configuration without this constituting a limitation of the present invention; for example, they could be constituted by an actuator 1 that actuates one wheel of one of the two front and rear pairs, the other wheel of the same pair being actuated by a coupling bar, or they might be constituted by an actuator 1, which also acts as a linking bar.

The operation of the invention is as follows.

With reference to the system 1 shown in FIG. 1, and assuming for example that one wishes to turn to the left starting from the configuration with "straight" wheels, all four wheels R being of the steered type, the hydraulic power steering unit 27 sends the fluid into the chamber 6b (at a higher pressure) of the actuator 1 that operates the rear wheels R2, pushing the corresponding piston 4 toward the end plate 3 of the corresponding chamber 6a (at a lower pressure).

The fluid in output from the chamber 6a of the actuator 1 is conveyed by the line 28 so as to feed the chamber 6b (at a higher pressure) of the actuator 1 that actuates the front wheels R1, while the fluid in output from the chamber 6a of this last actuator 1 returns to the tank 25.

Figure 4:
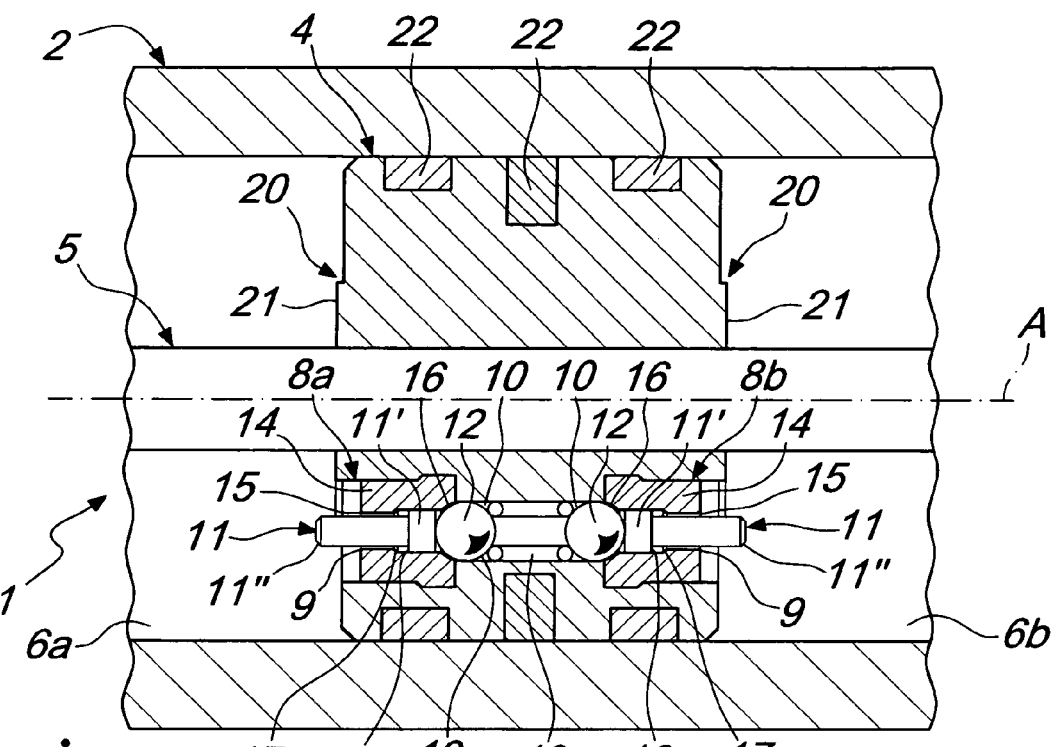
FIG. 4 is a schematic enlarged-scale view of the piston of FIG. 2.

As long as the piston 4 of the actuator 1 that actuates the rear wheels R2 moves between the chambers 6b and 6a, varying their respective volume (FIGS. 2 and 4), the valve 8a remains closed even though the valve 8b is at least partially opened by the pressure applied to the respective flow control element 12 by the pressurized fluid inside the chamber 6b.

When the piston 4 of the actuator 1 that actuates the rear wheels R2 is located proximate to the end plate 3 of the corresponding chamber 6a, the end 11" of the stem 11 of the respective valve 8a abuts against the end plate 3, and as the piston 4 advances toward it, the opposite end 11' of the stem 11, in contrast with the spring 19, presses against the flow control element 12 of the valve 8a, opening it.

It should be noted that in order to ensure that the valve 8a opens, the pressure inside the chamber 6b, multiplied by the area of the contact seat 16 of the flow control element, must be lower than the load of the spring 19 (in the compressed configuration).

Figure 5:
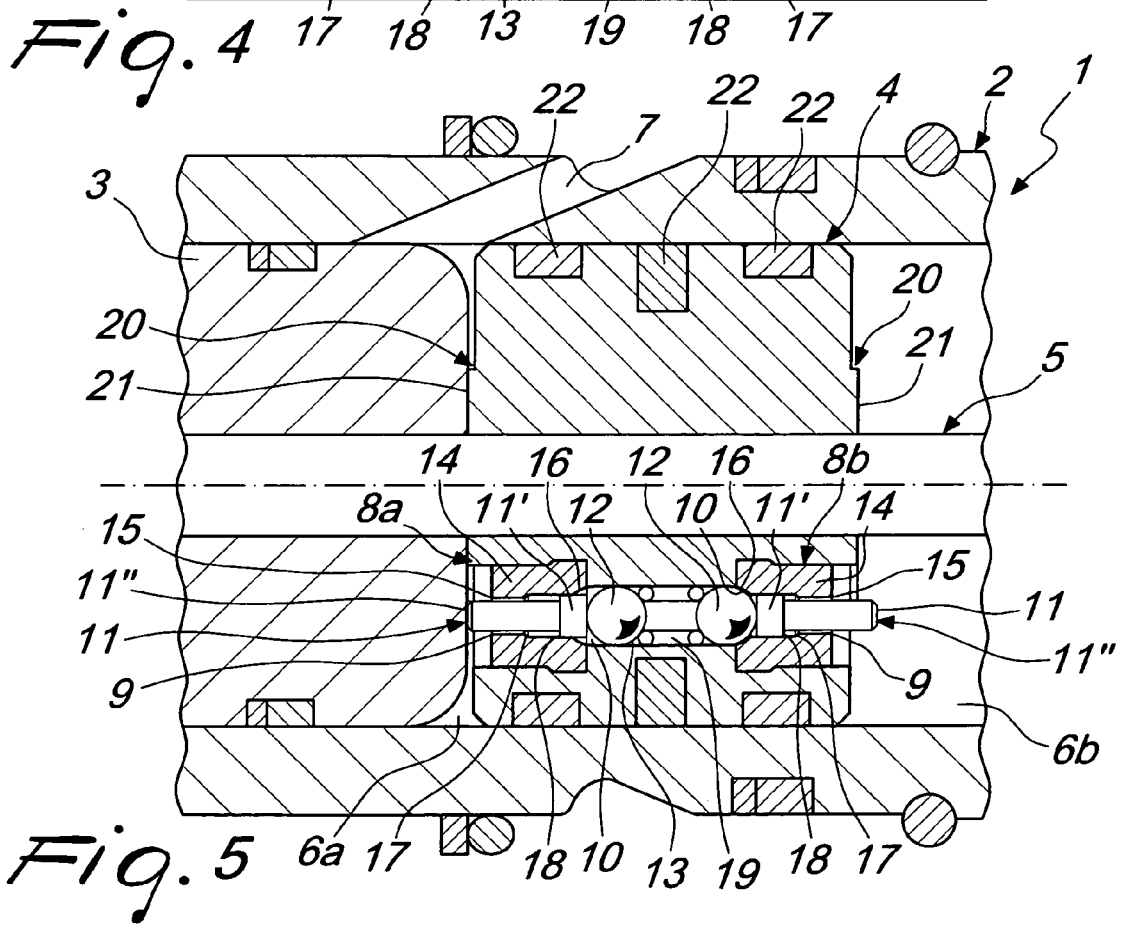
FIG. 5 is a schematic enlarged-scale view of the piston of FIG. 3.

In this configuration (FIGS. 3 and 5), a given amount of fluid bleeds, in a controlled manner, from the chamber 6b (at a higher pressure) to the chamber 6a (at a lower pressure), the valve 8b being at least partially opened by the pressure applied to the respective flow control element 12 by the pressurized fluid inside the chamber 6b.

This "overfed" amount is sent to the chamber 6b of the actuator 1 that actuates the front wheels R1, of which it therefore takes up any unwanted misalignments with respect to the rear wheels R2 caused by any accidental internal bleeding of the respective actuator 1.

The continuity of the hydraulic connection between the chamber 6a of the actuator 1 that actuates the rear wheels R2 and the chamber 6b of the actuator 1 that actuates the front wheels R1 is ensured by the protrusion 21, which keeps the chamber 6a of the first actuator at a nonzero volume.

It is noted that it is not possible to predict which of the pistons 4 of the two actuators 1 that constitute the two actuation mechanisms M1 and M2 will be the first to reach the end of its stroke; this timing order is irrelevant as regards the operation of the actuator 1, which by being applied to both actuation mechanisms M1 and M2 allows in any case to take up misalignments between the front wheels R1 and the rear wheels R2 caused by bleeding of fluid.

Moreover, the actuator 1 is symmetrical; its operation is therefore similar to the operation described above if a right turn is performed instead of a left turn.

The operation of the actuator 1 can be deduced easily by the person skilled in the art both in other steering configurations of the system G and if applied to steering systems having a different configuration.

In practice it has been found that the described invention achieves the intended aim and objects.

The actuator according to the invention in fact allows to realign automatically, precisely and constantly the rear and front wheels of a vehicle with four steered wheels with a purely hydraulic or mechanical power steering system, regardless of the skill and sensitivity of the operators and of the particular operating conditions (dimensional tolerances of said cylinder, physical characteristics of the fluid, et cetera), without any electronic control device and without subjecting the gaskets of the corresponding piston to wear, stresses and damage in excess of those that occur during usual operation.

The actuator according to the invention provides fully automatic realignment of the wheels every time one of the two actuators applied to the two actuation mechanisms of the two pairs of front and rear wheels reaches the end of its stroke, without requiring any control or intervention on the part of operators.

With the actuator according to the invention, by steering to the stroke limit the wheels are made to assume the theoretical design steering angles, and therefore by realigning the steering wheel they resume a configuration in which they are perfectly aligned with respect to each other.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. M02004A000019 from which this application claims priority are incorporated herein by reference.

What is claimed is:

1. A fluid-operated linear actuator for power steering systems of vehicles with at least three steered wheels, of a double-acting type, comprising: a cylindrical body, which is closed at opposite ends thereof; a piston, which is accommodated inside said cylindrical body so as to be axially slideable between said opposite ends; a stem, which is rigidly associated with said piston, is substantially coaxial to said cylindrical body, and protrudes from both of said opposite ends of the cylindrical body for articulation to a steering system of a vehicle, said piston dividing said cylindrical body into two chambers, each of which is provided with an opening that is formed proximate to said opposite ends for inflow and/or outflow of a working fluid; said piston comprising at least one pair of one-way valves, which have a respective inlet connected to a respective one of said chambers, and respective outlets that are connected to each other, said valves being each provided with a stem and a flow control element, said stem being accommodated for axial sliding in said respective inlet and having a first end associated with the respective flow control element and a second opposite end that protrudes externally from said piston, said valve stem being adapted to open the respective valve, with the piston being located proximate to the closed end of one of said chambers and the other valve being at least partially opened by a flow of pressurized working fluid acting in another one of said chambers, for a transfer of an amount of fluid from the one of said chambers that is at a higher pressure to the other one of said chambers that is at a lower pressure.

2. The actuator of claim 1, wherein said valves are arranged inline, substantially parallel to an axis of said cylindrical body.

3. The actuator of claim 1, wherein said valve stems are each accommodated with clearance in said respective inlet.

4. The actuator of claim 3, wherein said inlets comprise stopping means for stopping sliding therein of the valve stem.

5. The actuator of claim 1, wherein it comprises spacing means for spacing said piston from said opposite ends of the cylindrical body, said spacing means being adapted to ensure a nonzero volume of a corresponding one of said chambers, said piston being located proximate to said ends.

6. The actuator of claim 5, wherein said spacer means comprises a protrusion that is formed on opposite faces of said piston and/or on said opposite ends.

7. The actuator of claim 6, wherein a protruding end of said valve stem is provided longer than a thickness of said protrusion and/or a stroke of said stem is longer than a thickness of said protrusion.

8. The actuator of claim 1, wherein said valves comprise elastic contrast means, which are interposed between the respective flow control element and outlet.

9. A power steering system for vehicles with at least three steered wheels, comprising: a hydraulic power steering device; a transfer line; fluid operated actuation mechanisms; at least one steered front wheel and two steered rear wheels, which are associated with a respective one of said fluid-operated actuation mechanisms, a fluid tank; and a pump for feeding fluid from said tank to the hydraulic power steering device, which is associated with the line for transfer to said actuation mechanisms and for return to said tank, wherein at least one of said fluid-operated actuation mechanisms comprises at least one fluid-operated linear actuator as set forth in claim 1 that has the stem connected to the piston protruding from both of the opposite ends of the cylindrical body in order to actuate respective ones of said wheels.

10. The system of claim 9, wherein each one of said fluid-operated actuation mechanisms comprises at least one fluid-operated linear actuator as set forth in claim 1.

11. The system of claim 9, wherein each one of said fluid-operated actuation mechanisms comprises a fluid-operated linear actuator as set forth in claim 1, with the stem protruding from both of the opposite ends of the cylindrical body in order to actuate the respective wheels.

12. The system of claim 9, wherein each one of said fluid-operated actuation mechanisms comprises a pair of fluid-operated linear actuators as set forth in claim 1 with connected chambers, the stem of each one of said two actuators protruding from a single opposite end of said cylindrical body in order to actuate the respective wheel.

13. A fluid-operated linear actuator for power steering systems of vehicles with at least three steered wheels, of a double-acting type, comprising: a cylindrical body, which is closed at opposite ends thereof; a piston, which is accommodated inside said cylindrical body so as to be axially slideable between said opposite ends; a stem, which is rigidly associated with said piston, is substantially coaxial to said cylindrical body, and protrudes from at least one of said opposite ends of the cylindrical body, said piston dividing said cylindrical body into two chambers, each of which is provided with an opening that is formed proximate to said opposite ends for inflow and/or outflow of a working fluid; said piston comprising at least one pair of one-way valves, which have a respective inlet comprising stopping means and connected to a respective one of said chambers, and respective outlets that are connected to each other, said valves being each provided with a stem and a flow control element, said stem being accommodated with clearance for axial sliding in said respective inlet_stopped by said stopping means and having a first end associated with the respective flow control element and a second opposite end that protrudes externally from said piston, and wherein said valve stem is adapted to open the respective valve, with the piston being located proximate to the closed end of one of said chambers and the other valve being at least partially opened by a flow of pressurized working fluid acting in another one of said chambers, for a transfer of an amount of fluid from the one of said chambers that is at a higher pressure to the other one of said chambers that is at a lower pressure.

14. The actuator of claim 13, wherein said valves are arranged inline, substantially parallel to an axis of said cylindrical body.

15. The actuator of claim 13, wherein it comprises spacing means for spacing said piston from said opposite ends of the cylindrical body, said spacing means being adapted to ensure a nonzero volume of a corresponding one of said chambers, said piston being located proximate to said ends.

16. The actuator of claim 15, wherein said spacer means comprises a protrusion tat is formed on opposite faces of said piston and/or on said opposite ends.

17. The actuator of claim 16, wherein a protruding end of said valve stem is provided longer than a thickness of said protrusion and/or a stroke of said stem is longer than a thickness of said protrusion.

18. The actuator of claim 13, wherein said valves comprise elastic contrast means, which are interposed between the respective flow control element and outlet.

19. The actuator of claim 13, wherein said stem associated with the piston protrudes from both of said opposite ends of the cylindrical body.

20. In a power steering system for vehicles with at least three steered wheels, comprising: a hydraulic power steering device, a transfer line, fluid operated actuation mechanisms, at least one steered front wheel and two steered rear wheels associated with a respective one of said fluid-operated actuation mechanisms, a fluid tank, and a pump for feeding fluid from said tank to the hydraulic power steering device that is connected with the line for transfer of the fluid to said actuation mechanisms and for return of the fluid to said tank; at least one fluid-operated linear actuator that constitutes at least one of said fluid operated actuation mechanisms, the fluid-operated linear actuator comprising: a cylindrical body, which is closed at opposite ends thereof; a piston, which is accommodated inside said cylindrical body so as to be axially slideable between said opposite ends; a stem, which is rigidly associated with said piston, is substantially coaxial to said cylindrical body, and protrudes from both of said apposite ends of the cylindrical body for articulation to the vehicle steering system, said piston dividing said cylindrical body into two chambers, each of which is provided with an opening that is formed proximate to said opposite ends for inflow and/or outflow of a working fluid; said piston comprising at least one pair of one-way valves, which have a respective inlet connected to a respective one of said chambers, and respective outlets that are connected to each other, said valves being each provided with a stem and a flow control element, said stem being accommodated for axial sliding in said respective inlet and having a first end associated with the respective flow control element and a second opposite end that protrudes externally from said piston, said valve stem being adapted to open the respective valve, with the piston being located proximate to the closed end of one of said chambers and the other valve being at least partially opened by a flow of pressurized working fluid acting in another one of said chambers, for a transfer of an amount of fluid from the one of said chambers that is at a higher pressure to the other one of said chambers that is at a lower pressure.

* * * * *